US008454422B1

(12) United States Patent
D'Avanzo

(10) Patent No.: US 8,454,422 B1
(45) **Date of Patent: *Jun. 4, 2013**

(54) SLOT MACHINE AND METHOD OF USE

(75) Inventor: Scott D'Avanzo, Ladera Ranch, CA (US)

(73) Assignee: Adrenalin Gaming, LLC, Ladera Ranch, CA (US)

( * ) Notice: Subject to any disclaimer, the term of this patent is extended or adjusted under 35 U.S.C. 154(b) by 1030 days.

This patent is subject to a terminal disclaimer.

(21) Appl. No.: 11/561,260

(22) Filed: Nov. 17, 2006

Related U.S. Application Data

(63) Continuation-in-part of application No. 11/252,510, filed on Oct. 18, 2005, now Pat. No. 8,070,586.

(51) Int. Cl.
*A63F 13/00* (2006.01)
*G06F 17/00* (2006.01)

(52) U.S. Cl.
USPC .................. 463/20; 463/16; 463/17; 463/18; 463/19

(58) Field of Classification Search
USPC ............................................................ 463/20
See application file for complete search history.

(56) References Cited

U.S. PATENT DOCUMENTS

| | | | | |
|---|---|---|---|---|
| 5,393,057 | A * | 2/1995 | Marnell, II | 463/13 |
| 5,833,537 | A * | 11/1998 | Barrie | 463/21 |
| 6,695,696 | B1 * | 2/2004 | Kaminkow | 463/16 |
| 2004/0132522 | A1 * | 7/2004 | Seelig et al. | 463/16 |
| 2007/0042165 | A1 * | 2/2007 | Wang et al. | 428/204 |

* cited by examiner

*Primary Examiner* — David L Lewis
*Assistant Examiner* — Werner Garner
(74) *Attorney, Agent, or Firm* — Greenberg Traurig

(57) ABSTRACT

A slot machine and method of conducting a wagering game is disclosed. The slot machine incorporates a topper having a display unit corresponding to each primary game reel. Depending on its current state, the display units turn on and turn off in response to pre-established game indicia aligning along a payline. A payout is awarded when all the display units are turned on simultaneously after a game play. In other versions, a bonus display comprises a grid of display units or a segmented display unit in the form of a gaming symbol. With the grid, once a winning pattern of display units is illuminated, a bonus award is provided. Similarly, with the segmented display units, once all segments of one or more display units are illuminated, a bonus award is provided.

22 Claims, 9 Drawing Sheets

Fig. 4-a
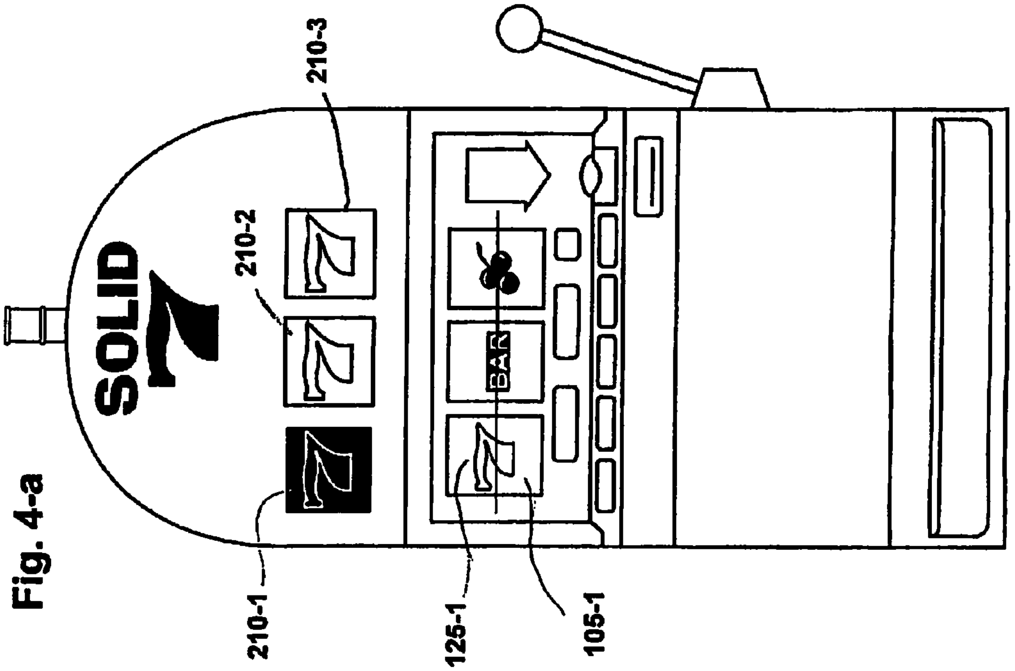
FIG. 3
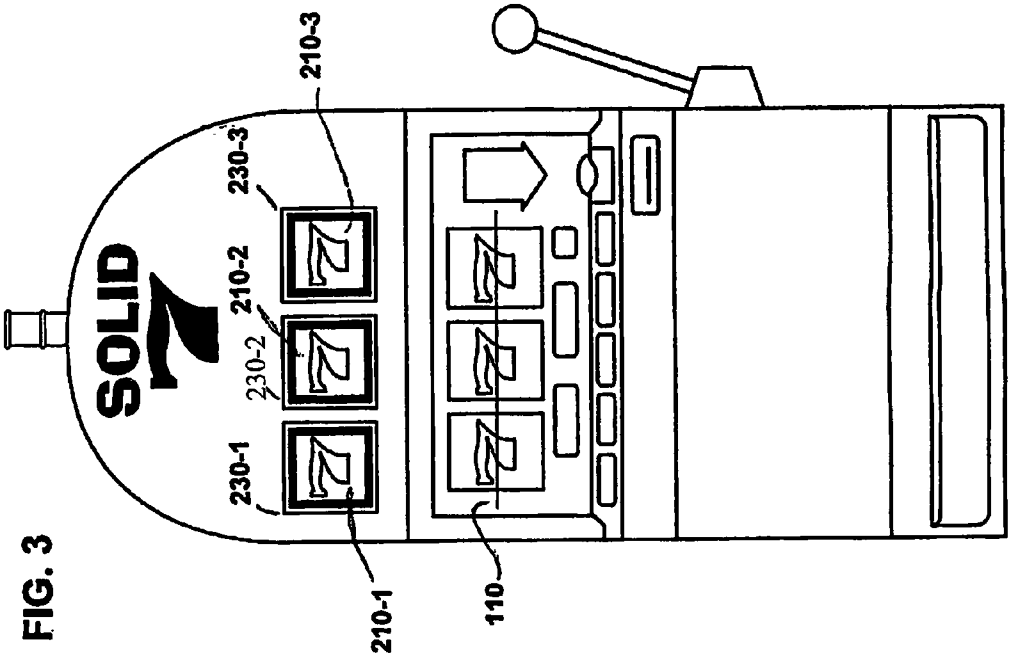

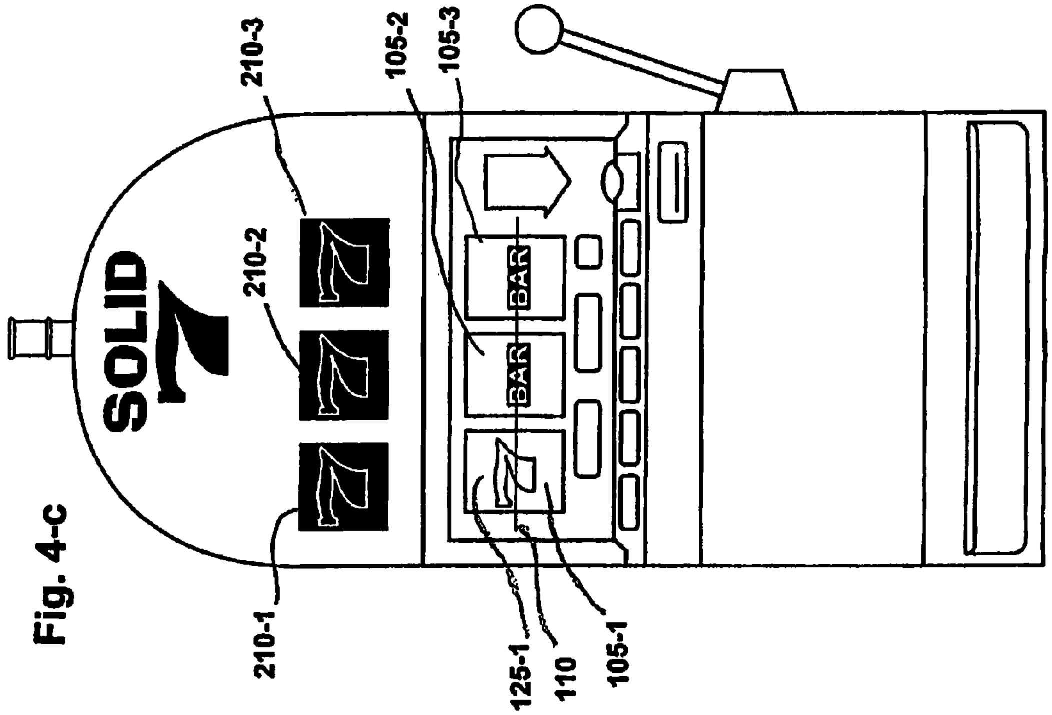
Fig. 4-c
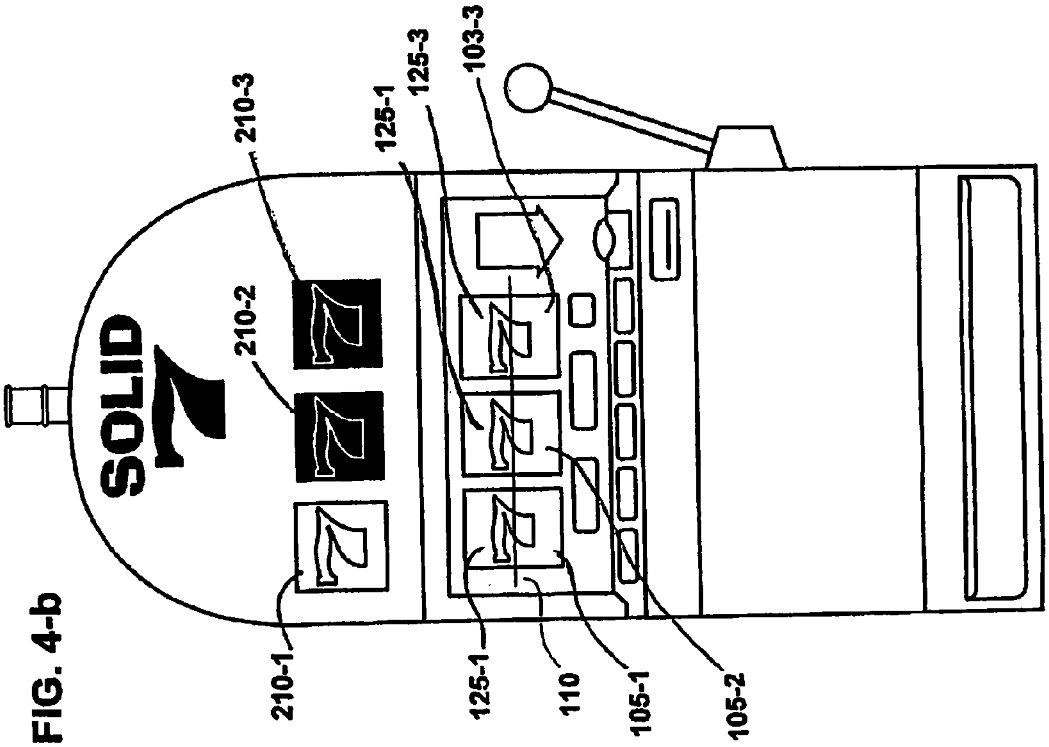
FIG. 4-b

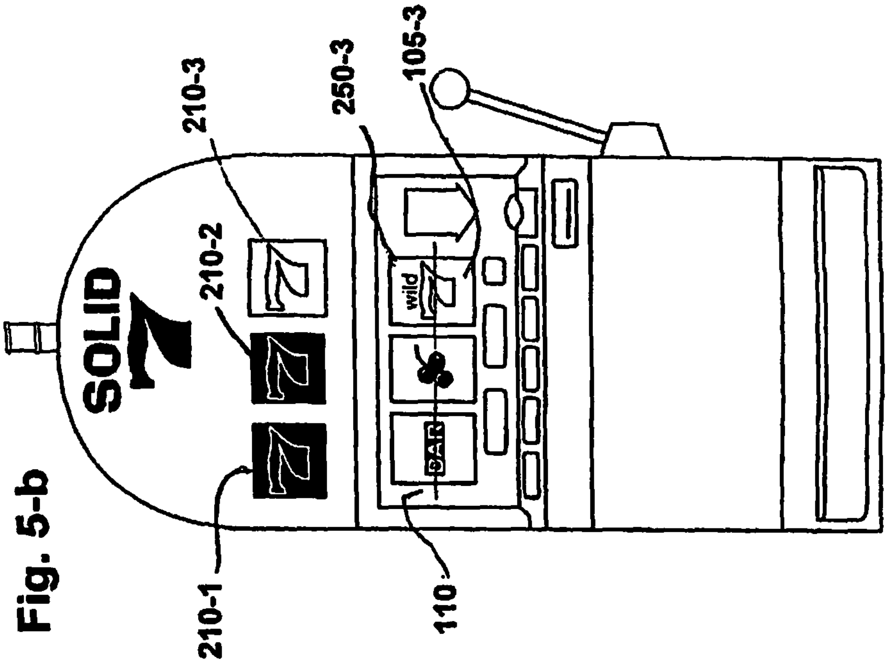
Fig. 5-b
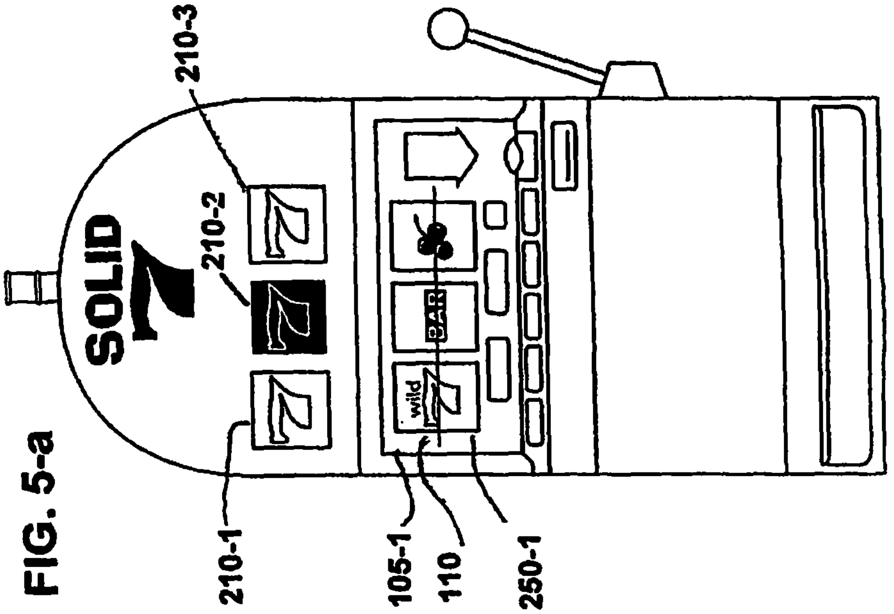
FIG. 5-a

Fig. 5-d
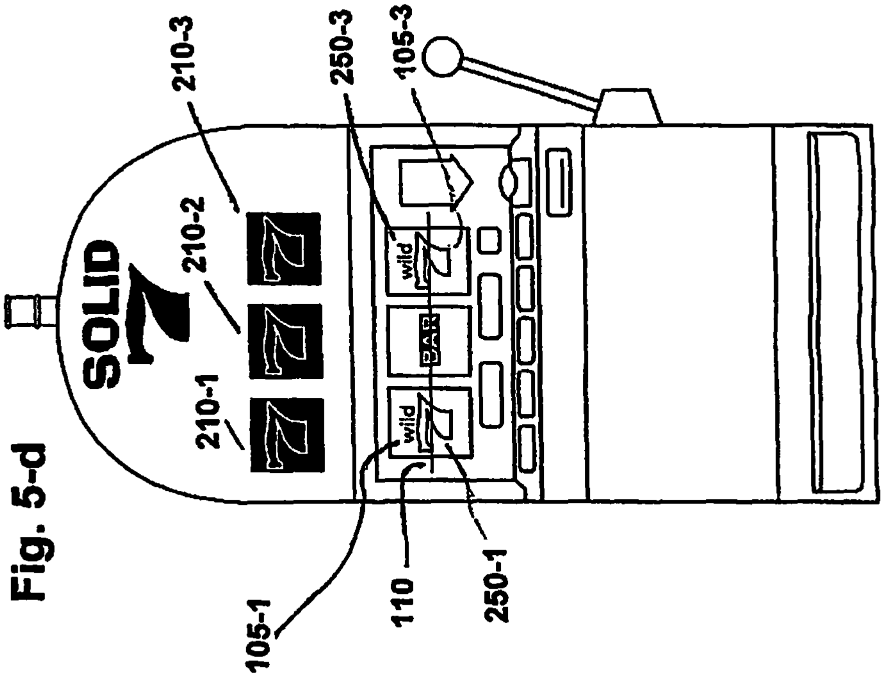
FIG. 5-c
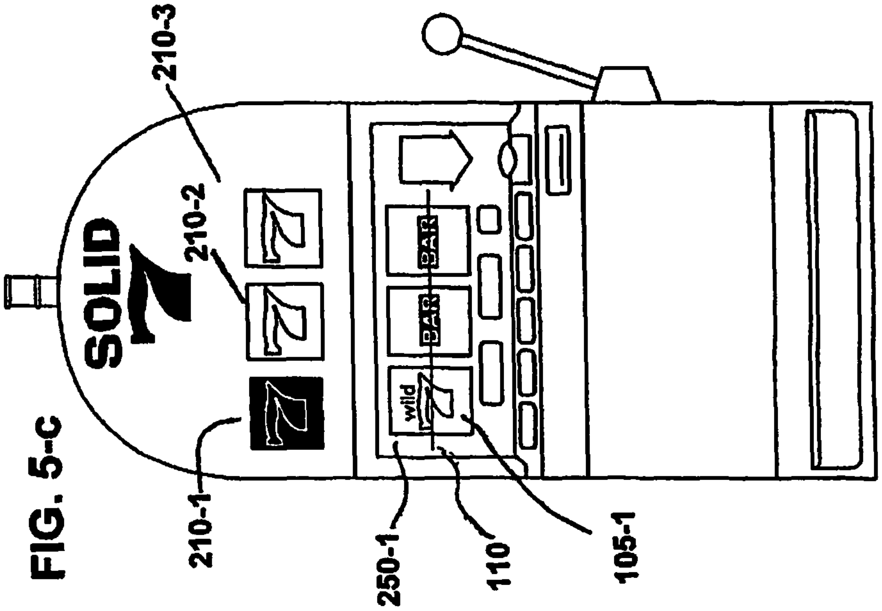

SLOT MACHINE AND METHOD OF USE

CROSS-REFERENCE TO RELATED APPLICATIONS

This application is a continuation-in-part of application Ser. No. 11/252,510 filed Oct. 18, 2005 now U.S. Pat. No. 8,070,586.

FIELD OF THE INVENTION

The embodiments of the present invention relate to an electronic gaming device in the form of a slot machine. More particularly, the embodiments include a slot machine incorporating a topper comprising a display unit corresponding to each reel of the slot machine wherein the display units are activated in response to primary game reel outcomes to determine a bonus award.

BACKGROUND

Electronic gaming devices, like slot machines, now account for over 60% of gaming revenue in casinos. Accordingly, new slot machine concepts are in increasing demand to satisfy the gaming public. Recent slot machine advances include large progressive jackpots, video graphics and bonus games and all have been successful.

In particular, bonus games are now associated with a majority of the slot machines in the marketplace. For example, the Wheel of Fortune slot machine includes a bonus game in the form of a numbered mechanical wheel. The bonus game, namely the wheel, is activated in response to pre-established primary game outcomes. Other bonus games comprise video-implemented games, ball-hoppers and player-selected outcomes.

Even though there has been an influx of new slot machines and bonus games, the new concepts and features are of a common theme and do not add to the overall excitement level of play of slot machines.

Thus, there is a need for new and exciting slot machine concepts.

SUMMARY

Accordingly, a first embodiment of the present invention comprises a method of conducting a wagering game comprising accepting a player wager; providing means for a player to activate a series of game reels, said game reels depicting game indicia; providing a display unit corresponding to each game reel; depending on its current state causing said display units to turn on or turn off in response to pre-established game indicia aligning along a payline; and in response to all display units being turned on simultaneously at the conclusion of a game play, paying a player a corresponding award.

In one embodiment, each game reel has at least one 7 symbol thereon and the display units each depict a 7 symbol when on and a blank when off. When a 7 symbol aligns along the payline, if it was off, the corresponding display turns on, and if it was on, it turns off. If all display units are on simultaneously at the conclusion of a game play such that all display units show a 7 symbol, the player wins a bonus.

In another embodiment, a method of conducting a wagering game comprises: accepting a player wager; providing means for a player to activate a series of game reels, said game reels depicting game indicia; providing a topper unit in the form of a grid wherein each grid position includes a display unit, a state of each display unit controlled by alignment of a pre-established game indicia on one of said game reels; depending on its current state causing said display units in said grid positions to turn on or turn off in response to the pre-established game indicia on one of said game reels aligning along a gaming device payline; and in response to a pre-established pattern of display units being turned on simultaneously at the conclusion of a game play, providing a player an award.

Other variations, embodiments and features of the present invention will become evident from the following detailed description, drawings and claims.

BRIEF DESCRIPTION OF THE DRAWINGS

FIG. 3 shows a slot machine of a first embodiment with bonus display units facilitated by a series of topper glass members or individual video displays;

FIGS. 4*a-c* show the slot machine of FIG. 1 with primary game outcomes causing the display units of the topper to activate;

FIGS. 5*a-c* show the slot machine of FIG. 1 with alternative primary game outcomes causing the display units of the topper to activate;

DETAILED DESCRIPTION

Figure 2:
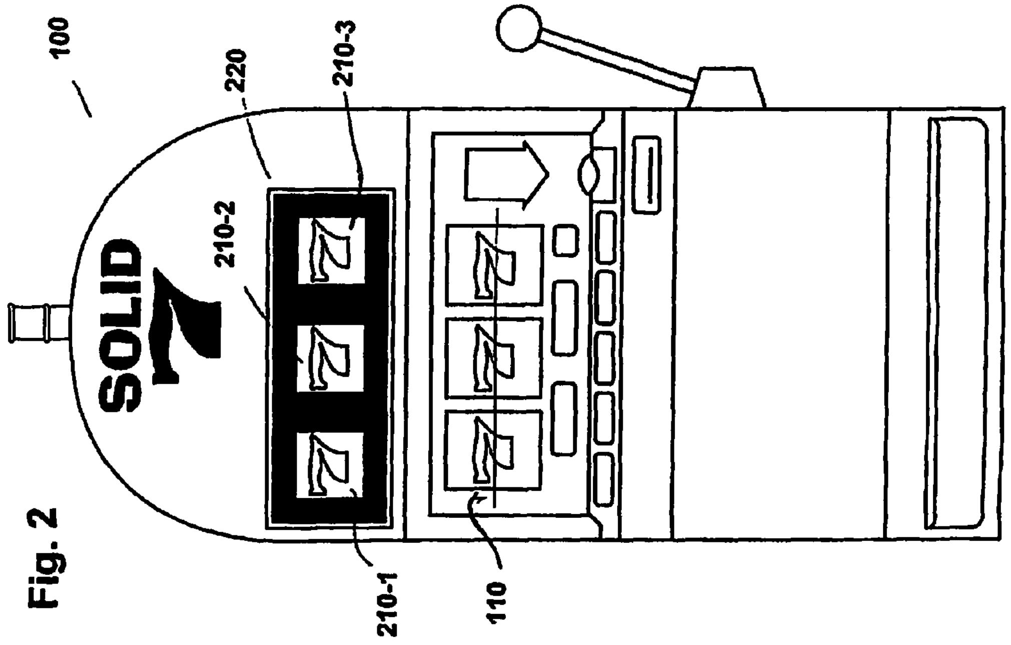
FIG. 2 shows a slot machine of a first embodiment with bonus display units facilitated by a single elongated piece of topper glass or single video display.

The operation of slot machines is controlled by microprocessors which communicate with internal memory devices and the external features of the machines. The microprocessors also incorporate, or communicate with, a random number generator which ensures the randomness of the machines' outcomes. In the embodiments of the present invention, one or more processors, along with memory and related devices, control the new applications disclosed herein. Therefore, the embodiments, along with the corresponding odds, of the present invention may be programmed into the processor or associated software. Since the technology for operating and controlling slot machines is well known to those skilled in the art, the subtle details are not described herein.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Figure 1:
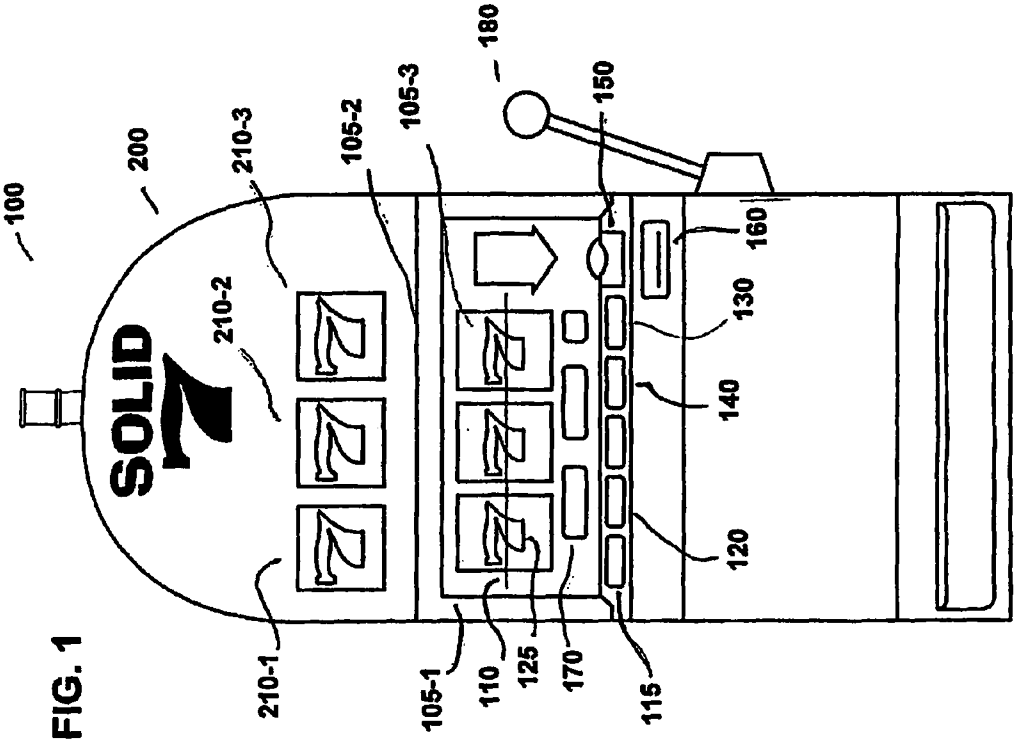
FIG. 1 shows a slot machine of a first embodiment of the present invention.

Reference is now made to the figures wherein like parts are referred to by like numerals throughout. FIG. 1 illustrates a slot machine for facilitating a first game embodiment of the present invention generally referred to by reference numeral 100. The slot machine 100 includes three game reels 105-1 through 105-3, depicting game indicia 125 and which may be mechanical or video, and a payline 110. While three game reels 105-1 through 105-3 are shown, the number may be more or less. The slot machine 100 further includes interface buttons, including a one coin/unit wager button 115, maximum coins/units button 120, spin button 130 and cash out button 140. The machine 100 also includes a coin input 150, card reader 160, credit display 170 and a slot arm 180. Optionally, the machine 100 may incorporate a currency and coupon reader.

The slot machine 100 includes a topper 200 with three display units 210-1 through 210-3 corresponding to each game reel 105-1 through 105-3. The three display units 210-1 through 210-3 may either be facilitated by backlit graphics or video means. With backlit graphics, the display units may comprise three symbols (e.g., 7 symbols) depicted on a single elongated piece of topper glass with illumination sources positioned behind the topper glass. With video means, a single video display is sectioned into three areas corresponding to each display unit. FIG. 2 shows a slot machine 100' including a single topper glass or video display 220. As shown in FIG. 3, the display units 210-1 through 210-3 may also be facilitated by individual topper glass members or video display units 230-1 through 230-3.

The display units 210-1 through 210-3 are activated in response to pre-determined gaming indicia aligning along the payline 110. Accordingly, in one embodiment game reels 105-1, 105-2 and 105-3 correspond to display units 210-1, 210-2 and 210-3, respectively. Thus, display unit 210-1 is controlled by the outcome of game reel 105-1, display unit 210-2 is controlled by game reel 105-2 and display unit 210-3 is controlled by game reel 105-3. FIGS. 4*a-c* illustrate the operation of the display units 210-1 through 210-3. In response to a 7 symbol aligning along reel 105-1, the corresponding display unit 210-1 turns on or turns off depending on its current state. That is, if the display unit is off, it turns on to show a 7 symbol, if it is on, it turns off such that the 7 symbol is no longer highlighted or visible. In FIG. 4*a*, in response to the 7 symbol 125-1 of game reel 105-1 aligning along payline 110, the display unit 210-1 turns on (shown in black) since it was previously off. Display units 210-2 and 210-3 are off (shown in white). In FIG. 4*b*, the primary game outcome shows three 7 symbols 125-1 through 125-3 depicted on game reels 105-1 through 105-3 aligned along payline 110. Accordingly, corresponding display unit 210-1 turns off and display units 210-2 and 210-3 turn on. In FIG. 4*c*, game reel 105-1 depicts a 7 symbol 125-1 aligned along payline 110 causing corresponding display unit 210-1 to turn on. Consequently, all three display units 210-1 through 210-3 are turned on resulting in a bonus award. That is, in response to all display units 210-1 through 210-3 being on (e.g., illuminated), the player wins a corresponding bonus award. With backlit graphics, the display units 210-1 through 210-3 are turned on by being illuminated by a light source behind the single topper glass member or the individual topper glass members. With video displays, the displays may display a 7 symbol when they are on and nothing when they are off.

The frequency, timing and order of the 7 symbols aligning along the payline 110 are controlled by the processor of the slot machine 100. The amount of the bonus award may be fixed (e.g., 10,000 credits) or may be a progressive award that increases until it is won. The progressive award may be based on the single machine, a bank of machines or a network of linked machines from multiple casino properties. To be eligible for the bonus award, the player may be requited to play max coins or units. The embodiments of the present invention may also be facilitated over a computer network, like the Internet.

As shown above, game reel 105-1, 105-2 and 105-3 corresponds to display units 210-1, 210-2 and 210-3, respectively, such that, display unit 210-1 is controlled by the outcome of game reel 105-1 and so on. However, it is also conceivable that the different game reels may control different display units. For example, game reel 105-3 may control display unit 210-1 or the arrangement may be random in nature.

FIGS. 5*a-c* illustrate a random embodiment of the present invention. In this embodiment, a wild symbol 250-1 depicted on game reel 105-1 and aligned along payline 110 causes a randomly selected display unit to turn on or off. In FIG. 5*a*, randomly selected display unit 210-2 is shown illuminated in response to wild symbol 250-1 aligning along payline 110. In FIG. 5*b*, randomly selected display unit 210-1 is shown illuminated in response to wild symbol 250-2 aligning along payline 110. In FIG. 5*c*, randomly selected display unit 210-2 is shown in a turned off position in response to random symbol 250-1 aligning along payline 110. In FIG. 5*d*, randomly selected display units 210-2 and 210-3 are shown illuminated in response to random symbols 250-1 and 250-2 aligning along payline 110. Consequently, all three display units 210-1 through 210-3 are turned on resulting in a bonus award. While the display nits 210-1 through 210-3 appear to be randomly selected, the processor continues to control the frequency and timing with which bonus awards are won. That is, the randomness is for the benefit of the players while the game is specifically programmed to theoretically award bonus awards only so often.

The wild symbol may also cause the display units 210-1 through 210-3 to illuminate in a random, frenzied manner until one display unit 210-1 through 210-3 illuminates or turns off.

Figure 6:
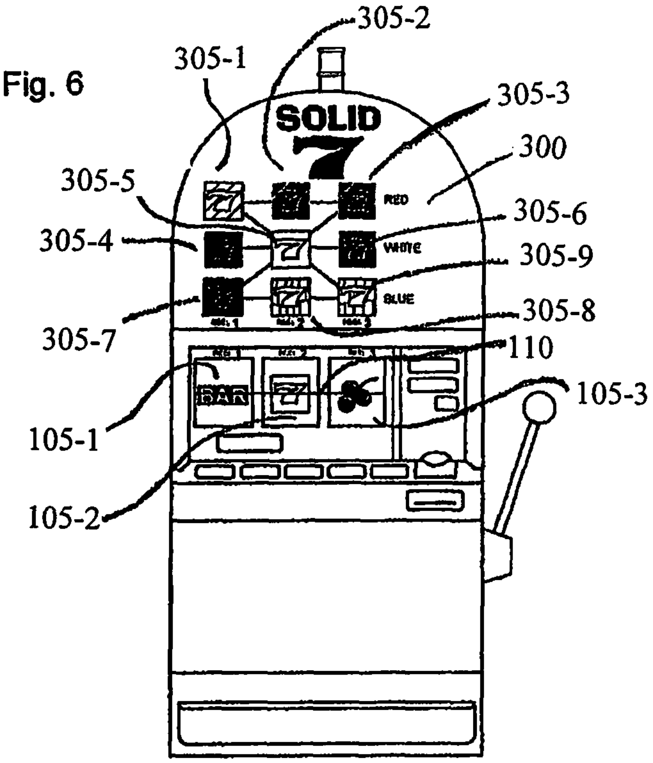
FIG. 6 shows a first alternative slot machine having a single payline and a topper comprising a grid of display units.

FIG. 6 shows a first alternative embodiment of the slot machine having a secondary game comprising a grid 300 of display units 305-1 through 305-9. As shown, the grid 300 is a 3×3 grid but could also be smaller (e.g., 2×2) or larger (e.g., 5×5). In this instance the display units are in the form of 7s. The display units 305-1 through 305-9 may be any desired symbols corresponding to gaming indicia on the slot machine reels 105-1 through 105-3 which can be mechanical or video. In one embodiment, each column of the grid includes a red, white and blue 7 corresponding to a red, white and blue 7 on each reel 105-1 through 105-3. Thus, reel 105-1 corresponds to a first grid column of the grid 300, reel 105-2 corresponds to a second column of the grid 300 and reel 105-3 corresponds to a third column of grid 300. As the red, white and blue 7s on each reel 105-1 through 105-3 align along the payline 110, the corresponding red, white or blue 7s in the grid column corresponding to the reel 105-1 through 105-3 either turn on (illuminate) or turn off depending on its current state. That is, if the display unit 305-1 through 305-9 is turned on, it turns off, and if the display unit 305-1 through 305-9 is turned off, it turns on.

There are two possible results should multiple of the same indicia along the payline 110 during a single spin (e.g., red 7s from both reel 105-1 and 105-3 align along the payline 110). In one embodiment, the first red 7 (i.e., the red 7 on reel 105-1) turns on or turns off the corresponding display unit 305-1 through 305-9 depending on the current state of the display unit 305-1 through 305-9. Then, the second red 7 (i.e., the red 7 on reel 105-3) causes the display unit 305-1 through 305-9 to return to its state prior to the spin. In other words, alignment of an even number of the same indicia causes the state of the display unit 305-1 through 305-9 to remain effectively unchanged. On the other hand, the alignment of an odd number of the same indicia causes the display unit 305-1 through 305-9 to change state. In a second embodiment, the alignment of multiple of the same indicia is treated the same as the alignment of a single indicia. So, the state of the display unit 305-1 through 305-9 changes.

In other embodiments, each column may correspond to a different reel 105-1 through 105-3 or rows of the grid 300 may correspond to a reel 105-1 through 105-3 or there may be a random correspondence.

Figure 7:
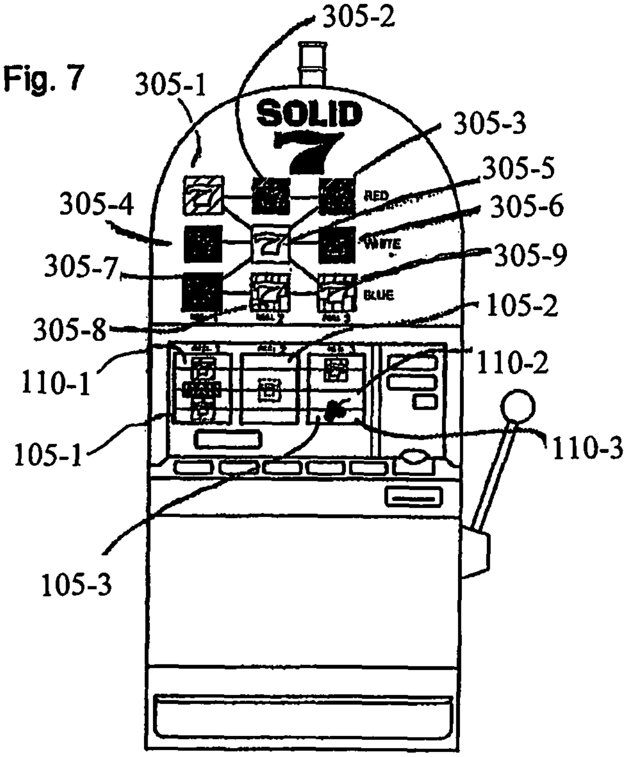
FIG. 7 shows the first alternative slot machine having multiple paylines and a topper comprising a grid of display units.

A winning outcome occurs when any three display units 305-1 through 305-9 comprising a row, column or diagonal are illuminated simultaneously. Other winning outcomes, including corners, blackouts and other patterns may also be utilized. Resultant bonus awards may be randomly determined or based on which column, row, diagonal or other pattern is illuminated. The slot machine's processor is programmed to dictate the frequency of the bonus awards. Accordingly, the display units 305-1 through 305-9 may be illuminated and turned off frequently while not providing an abundance of bonus awards. Those skilled in the art will recognize that the red, white and blue 7s may be dispersed in any manner within the grid 300. Any gaming symbol besides the 7s can also be used to facilitate the embodiments of the present invention. FIG. 7 shows a slot machine having multiple paylines 110-1 through 110-3 whereby the aligned gaming indicia along any activate payline 110-1 through 110-3 activate and deactivate the display units 3051 through 305-9.

Figure 8:
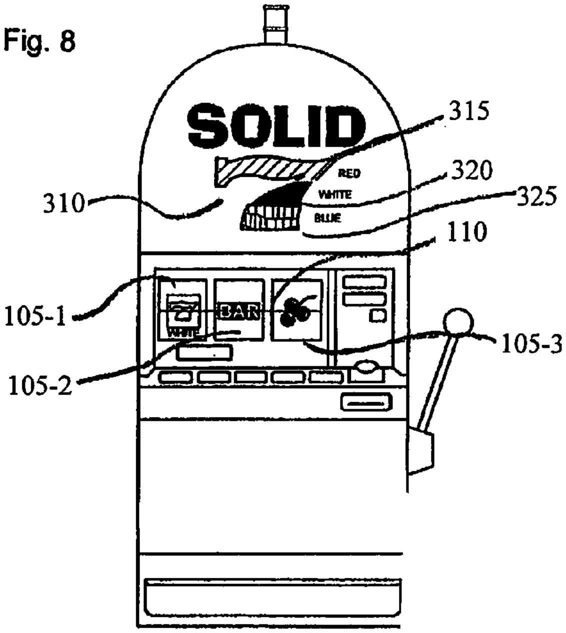
FIG. 8 shows a second alternative slot machine having a topper comprising a segmented display unit.

Now referring to FIG. 8, the topper comprises a single segmented display unit 310. In this case, the display unit 310 is a 7 comprising a red portion 315, white portion 320 and blue portion 325. In this embodiment, as red, white and blue 7s align along the payline 110, the corresponding red portion 315, white portion 320 and/or blue portion 325 turn on (illuminate) or turn off depending on its current state. Once the red portion 315, white portion 320 and blue portion 325 are turned on or illuminated simultaneously, a bonus is awarded. In this embodiment, any red, white or blue 7 aligned along the payline 110, regardless of which reel 105-1 through 105-3 it is depicted on, causes the corresponding red portion 315, white portion 320 or blue portion 325 of the display unit 310 to turn on (illuminate) or turn off. In other words, the display unit 310 is not reel specific. As described above, the alignment of multiple of the same indicia on a single spin may have different results depending on the embodiment.

Figure 9:
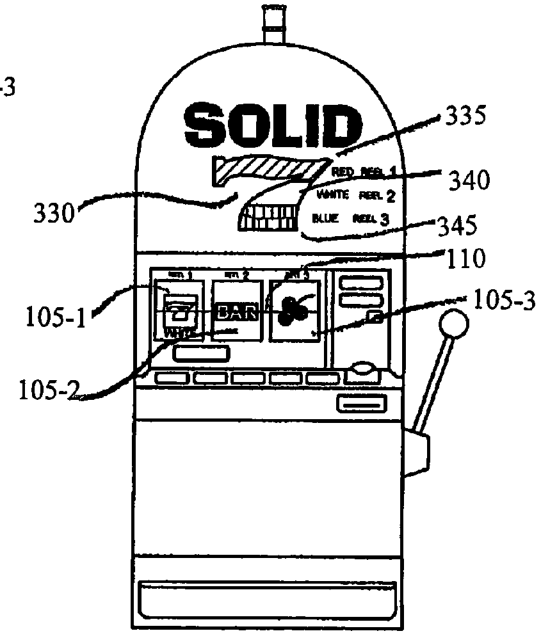
FIG. 9 shows a modified form of the second alternative of the slot machine comprising an alternative segmented display unit.

FIG. 9 shows a topper comprising a single segmented display unit 330. However, in this instance, a red portion 335, white portion 340 and blue portion 345 correspond to specific reels 105-1 through 105-3. As shown in FIG. 9, the red portion 335, white portion 340 and blue portion 345 correspond to reel 105-1, reel 105-2 and reel 105-3, respectively. Consequently, when any 7 on reel 105-1 aligns along payline 110, the red portion 335 turns on or turns off depending on its current state; when any 7 on reel 105-2 aligns along payline 110, white portion 340 turns on or turns off depending on its current state; and when any 7 on reel 105-3 aligns along payline 110, blue portion 345 turns on or turns off depending on its current state. Once the red portion 315, white portion 320 and blue portion 325 are turned on or illuminated simultaneously, a bonus is awarded. In another embodiment, only red 7s on reel 105-1, white 7s on reel 105-2 and blue 7s on reel 105-3 activate or deactivate the red portion, 335, white portion 340 and blue portion 345, respectively, of the segmented display unit 330.

Figure 10:
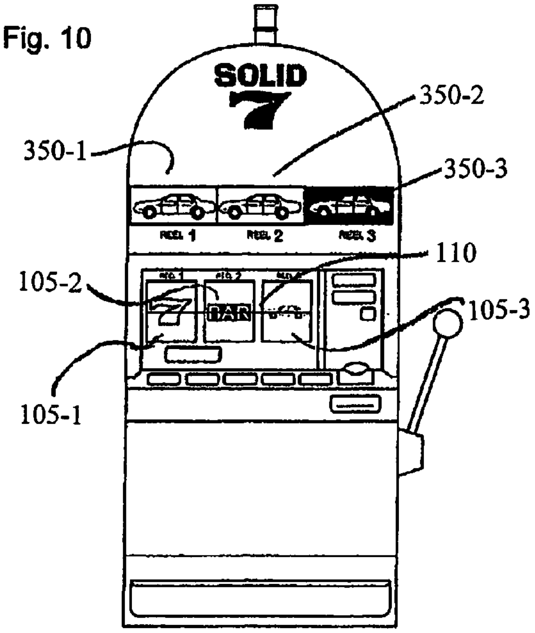
FIGS. 10-12 show alternative topper designs premised on various game themes.
Figure 11:
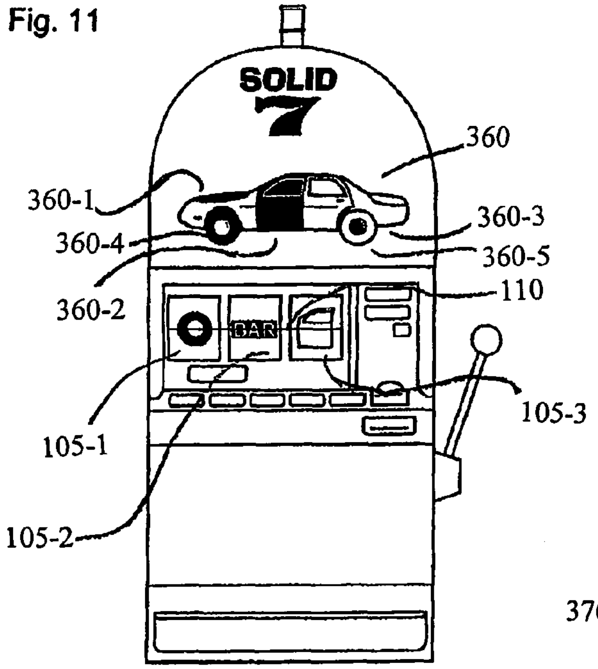
Figure 12:
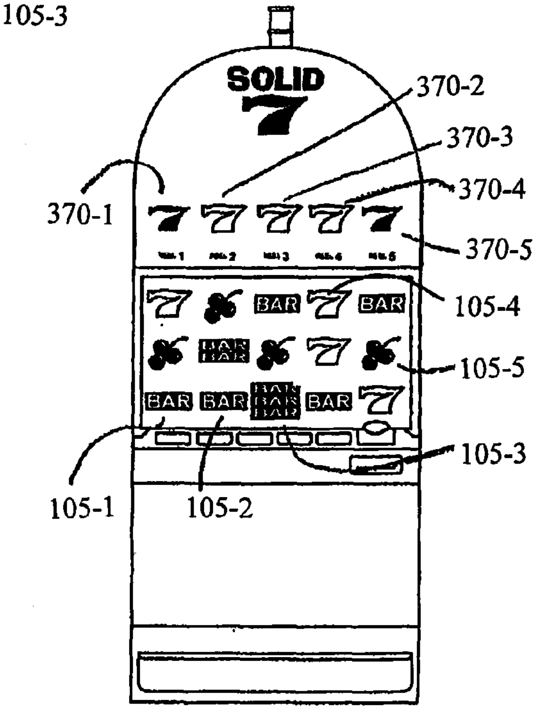

While the 7 symbol is discussed herein, any topper symbol (s) corresponding to indicia on gaming device reels may be used. For example, as shown in FIGS. 10 and 11, a series of display units 350-1 through 350-3 or a segmented display unit 360 in the form of a car can be used to giveaway a car. That is, once all display units 350-1 through 350-3 or segments 360-1 through 360-5 (three body section and two tires) of the car are turned on or illuminated, the player wins a car. It will be recognized by those skilled in the art that more or less than three display units or segments can be utilized with the embodiments of the present invention. For example, FIG. 12 shows a topper having five 7s 370-1 through 370-5 corresponding to a five reel 105-1 through 105-5 video slot machine.

Figure 13:
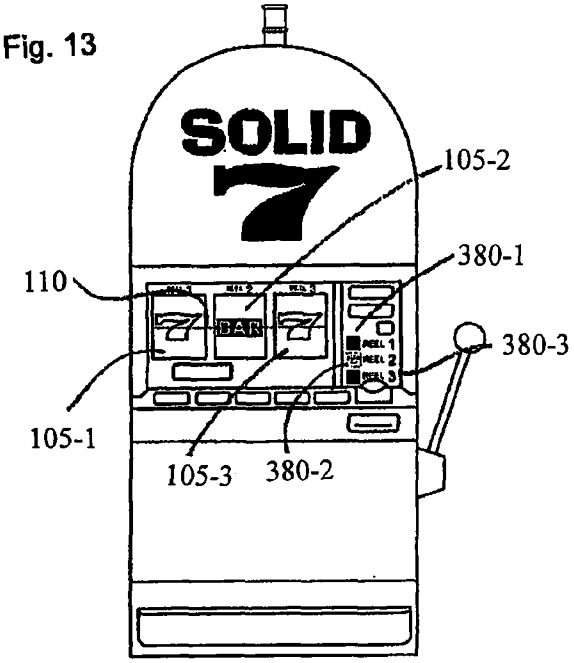
FIGS. 13-15 show various slot machines having the display units incorporated into a side unit rather than a topper.
Figure 14:
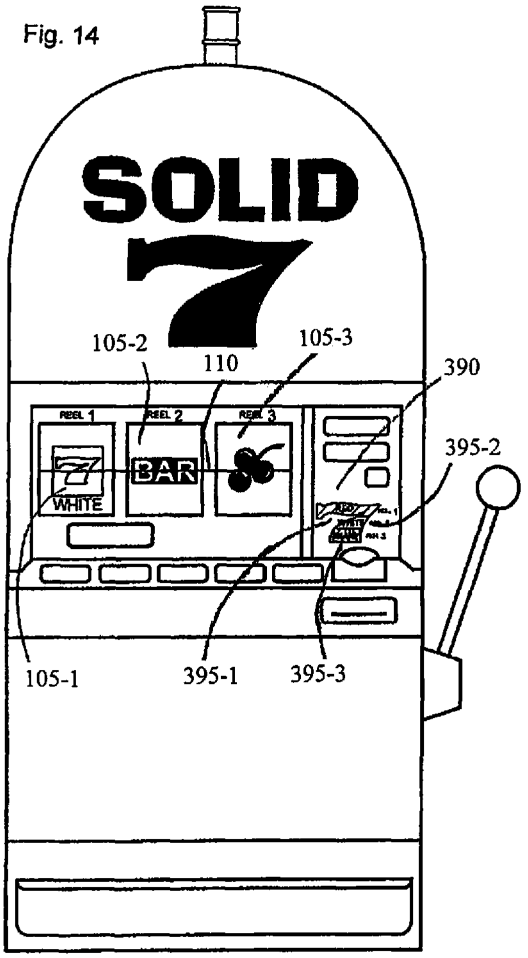
Figure 15:
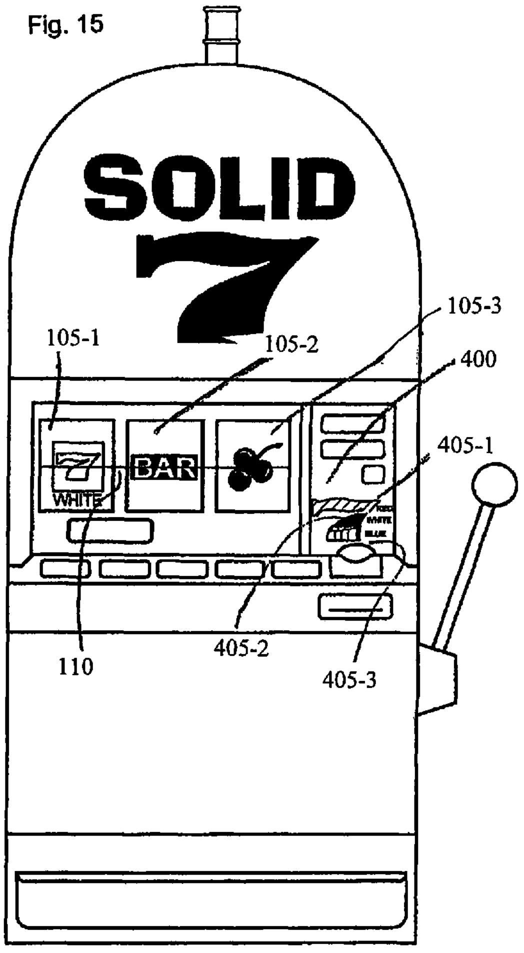

It is also conceivable that the display units need not be integrated into a topper. That is, the display units may be integrated adjacent to the game reels or anywhere on the gaming device accommodating placement of individual display units or a video screen. FIGS. 13-15 show slot machines having the display units incorporated into a side area next to the reels. Specifically, FIG. 13, shows three display units 380-1 through 380-3 corresponding to the reels 385-1 through 385-3; FIG. 14 shows a slot machine having a segmented display unit 390 (reel specific) with three portions 395-1 through 395-3 corresponding to the reels 105-1 through 105-3; and FIG. 15 shows a slot machine having a segmented display unit 400 (non-reel specific) with three portions 405-1 through 405-3 corresponding to the reels 105-1 through 105-3.

Although the invention has been described in detail with reference to several embodiments, additional variations and modifications exist within the scope and spirit of the invention as described and defined in the following claims.

I claim:

1. A method of conducting a wagering game comprising:

accepting a player wager;

providing means for a player to activate a series of game reels, said game reels depicting game indicia;

providing a grid wherein each grid position includes a display unit, a state of each display unit controlled by alignment of a pre-established game indicia on one of said game reels, said grid positioned visually separate from said game reels;

depending on a current state of said display unit causing said display unit in said grid position to turn on if the display unit is off, or turn off if the display unit is on, in response to the pre-established game indicia on one or more of said game reels aligning along a gaming device payline; and in response to a pre-established pattern of display units being turned on or off simultaneously at the conclusion of a game play, providing the player an award, said award not dependent upon a position of said game indicia relative to said grid.

2. The method of claim 1 further comprising integrating the display units into a topper unit.

3. The method of claim 1 further comprising providing display units facilitated by backlit graphics.

4. The method of claim 1 further comprising providing display units facilitated by video means.

5. The method of claim 1 further comprising providing a 3×3 grid wherein display units in each column are activated by indicia of a designated reel aligning along the gaming device payline.

6. The method of claim 5 further comprising turning on or off display units in column 1 of the grid based on indicia of reel 1 aligned along the payline, display units in column 2 of the grid based on indicia of reel 2 aligned along the payline and display units in column 3 of the grid based on indicia of reel 3 aligned along the payline.

7. A method of conducting a wagering game comprising:
accepting a player wager;
providing means for a player to activate a series of game reels, said game reels depicting game indicia;
providing one or more display units each having multiple segments, a state of each display unit segment controlled by alignment of a pre-established game indicia on one or more of said game reels, said one or more segmented display units positioned visually separate from said game reels;
depending on a current state of a display unit segment, causing the display unit segment to turn on if the display unit segment is off, or turn off if the display unit segment is on, in response to the pre-established game indicia on one or more of said game reels aligning along the gaming device payline; and
in response to all display unit segments of one or more of the display units being turned on or off simultaneously at the conclusion of a game play, providing the player an award, said award not dependent upon a position of said game indicia relative to said one or more segmented display units.

8. The method of claim 7 further comprising turning on segments of the one or more display units by illuminating the segments via backlight.

9. The method of claim 7 further comprising turning on segments of the one or more display units via video means.

10. The method of claim 7 further comprising turning on and off segments of the one or more display units based on gaming indicia of corresponding gaming device reels being aligned along the payline.

11. The method of claim 7 further comprising providing the display units in a form corresponding to one or more pre-established game indicia on the game reels.

12. A method of conducting a wagering game comprising:
accepting a player wager;
providing means for a player to activate a series of game reels, said game reels depicting game indicia;
providing one or more display units each having multiple segments, a state of each segment of each said display unit controlled by alignment of one or more pre-established game indicia on a single corresponding game reel, said one or more segmented display units positioned visually separate from said game reels;
depending on a current state of a display unit segment, causing the display unit segment to turn on if the display unit segment is off, or turn off if the display unit segment is on, in response to the one or more pre-established game indicia on said single game reel aligning along the gaming device payline; and
in response to each segment of one or more of the display units being turned on or off simultaneously at the conclusion of a game play, providing the player an award, said award not dependent upon a position of said game indicia relative to said one or more segmented display units.

13. The method of claim 12 further comprising turning on segments of the one or more display units by illuminating the segments via backlight.

14. The method of claim 12 further comprising turning on segments of the one or more display units via video means.

15. The method of claim 12 further comprising providing the display units in a form corresponding to one or more pre-established game indicia on the game reels.

16. A slot machine comprising:
a processor;
a series of game reels depicting game indicia;
a bonus display in the form of a grid wherein each grid position depicts a display unit corresponding to game indicia on the series of game reels, said grid positioned visually separate from said game reels; and
wherein in response to pre-established game indicia aligning along a payline, said processor causes pre-designated display units, depending on a current state, to turn on if the display unit is off, or turn off if the display unit is on, said processor further causing a payout to be awarded in response to a series of turned on or off display units forming a pre-established winning pattern at the conclusion of a game play, said payout not dependent upon a position of said game indicia relative to said grid.

17. The slot machine of claim 16 wherein the bonus display is integrated into a topper unit.

18. The slot machine of claim 17 wherein the display units are implemented using backlit graphics.

19. The slot machine of claim 18 wherein the display units are facilitated by video means.

20. A slot machine comprising:
a processor;
a series of game reels depicting game indicia;
one or more display units each having multiple segments corresponding to game indicia on the series of game reels, said one or more segmented display units positioned visually separate from said game reels; and
wherein in response to pre-established game indicia aligning along a payline, said processor causes pre-designated display segments, depending on a current state, to turn on if the display unit segment is off, or turn off if the display unit segment is on, said processor further causing a payout to be awarded in response to a series of turned on or off display unit segments forming a pre-established winning pattern at the conclusion of a game play, said payout not dependent upon a position of said game indicia relative to said one or more segmented display units.

21. The slot machine of claim 20 wherein the display units are facilitated by backlit graphics.

22. The slot machine of claim 20 wherein the display units are facilitated by a video means.

* * * * *